United States Patent [19]

Kraus et al.

[11] 3,818,762

[45] June 25, 1974

[54] PHASE CHANGE DETECTOR CUP

[75] Inventors: Max H. Kraus, Montgomery County; Michael P. Baccellieri, Philadelphia, both of Pa.; Bruce McClintock, Williamstown, N.J.

[73] Assignee: Electro-Nite Co., Philadelphia, Pa.

[22] Filed: Apr. 5, 1972

[21] Appl. No.: 241,178

[52] U.S. Cl. ............... 73/359, 73/17 R, 117/231
[51] Int. Cl. ............... G01k 11/06, G01n 25/06
[58] Field of Search............ 117/128, 135.1, 169 A, 117/231; 136/230, 231, 232, 233, 234; 29/588; 73/354, 359, 17 R

[56] References Cited
UNITED STATES PATENTS

| | | | |
|---|---|---|---|
| 798,260 | 8/1905 | Bristol | 117/169 A |
| 2,504,764 | 4/1950 | Vollrath | 117/231 |
| 2,757,220 | 7/1956 | Carter | 136/233 |
| 2,832,705 | 4/1958 | Seidl | 117/169 A |
| 3,291,638 | 12/1966 | Stadlen et al. | 117/231 |
| 3,467,542 | 9/1969 | Nordlie | 136/234 |
| 3,610,045 | 4/1965 | Shearman | 136/234 |
| 3,611,808 | 10/1971 | Boron et al. | 73/359 |
| R26,409 | 6/1968 | Hance | 73/359 |

*Primary Examiner*—Daniel J. Fritsch
*Attorney, Agent, or Firm*—Seidel, Gonda & Goldhammer

[57] ABSTRACT

The thermocouple support post in a phase change cup is made from or coated with a high alumina content refractory coating having an annealing point at approximately the solidus arrest temprature of molten metal so that the refractory is sufficiently plastic to accommodate forces resulting from shrinkage of the molten metal as it cools.

6 Claims, 4 Drawing Figures

PATENTED JUN 25 1974      3,818,762
FIG.1
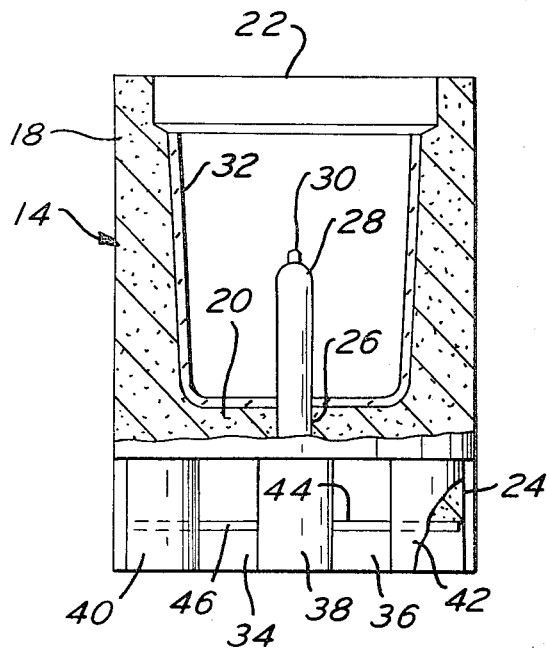
FIG.2
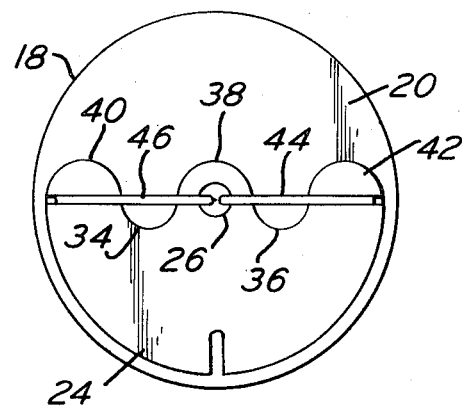
FIG.3
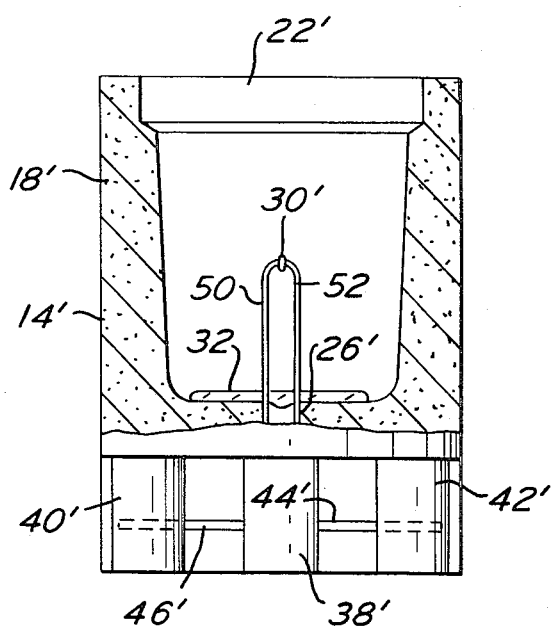
FIG.4
|  | WT. PERCENT |
|---|---|
| $Al_2O_3$ | 83 |
| $SiO_2$ | 15.1 |
| $FeO_3$ | 0.4 |
| $CaO$ | 0.2 |
| $MgO$ | 0.1 |
| $Na_2CO_3$ | 0.7 |
| $TiO_2$ | 0.5 |

PHASE CHANGE DETECTOR CUP

This invention relates to a phase change cup containing a thermocouple for detecting phase change in molten metal as it cools and solidifies. Such phase change cups, per se, are known, and include a ceramic dual bore tube containing a thermocouple having its hot junction within the cup below the location of any shrinkage cavity in the molten metal as it cools in the cup.

When hypoeutectic cast iron was tested for phase change data, a substantial number of failures occurred. An X-ray of the dual bore center post showed that the center post had cracked radially. Molten metal in the crack undoubtedly resulted in short-circuiting the thermocouple which forms a false hot junction, thereby rendering any reading inaccurate or erratic. Such failures have occurred notwithstanding the fact that the center post was coated with a layer of high temperature refractory such as Sauerisen (brand name) cement. The present invention solves this cracking problem by making the center post from or coating the center post with a high alumina refractory coating to be described in greater detail hereinafter.

The cup is adapted to be used in detecting liquidus, solidus, and/or eutectoid arrest points with uniform cooling to provide graph traces which are sharp and easy to read. The thermocouple hot junction is preferably welded so as to be smaller than and more accurate than a hot junction formed by twisting the wires.

It is an object of the present invention to provide a phase change cup wherein the center post is not likely to crack and permit the thermocouple to be short-circuited.

It is another object of the present invention to provide a method of making a phase change cup in a manner whereby thermocouples are not likely to be short-circuited by molten metal during phase change in the metal.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a vertical sectional view of a phase change cup incorporating the present invention.

FIG. 2 is a bottom plan view of the cup shown in FIG. 1.

FIG. 3 is a view similar to FIG. 1, but illustrating another embodiment.

FIG. 4 is a chart showing components of the refractory coating material.

Referring to the drawing in detail, wherein like numerals indicate like elements, there is shown in FIG. 1 a vertical sectional view of a phase change cup 14 incorporating the present invention. Cup 14 is preferably made from a monolithic mass of material such as resin-coated sand or other equivalent material which will permit a thermal arrest curve to be detected and recorded within about one minute. Cup 14 includes a cylindrical wall 18 open at its top and provided with a bottom wall 20. The upper lip of the wall 18 is counter-bored at 22 so as to provide a visual indicator whereby it will be readily ascertained that the capacity of the cup is being approached.

The bottom wall 20 is provided with a boss or extension 24. The boss 24, as shown more clearly in FIG. 2, is generally semi-circular. A central bore 26 is provided in the bottom wall 20 and extends through the boss 24.

A dual bore cylinder or center post 28 of ceramic material is provided. Each of the bores in cylinder 28 receives one of the thermocouple wires which are joined, but preferably welded, together at the hot junction 30 which is located as shown to be below any shrinkage cavity. A wide variety of materials for the thermocouple wires such as chromel-alumel are known to those skilled in the art. A refractory material is applied as a coating 32 to the outer surface of cylinder 28, over the hot junction 30, and to the inner peripheral surface of the walls 18 and 20. If desired, the entire cylinder 28 may be made from a material having the desired thermal properties of coating 32. In either event, the thermocouple wires are surrounded by the material of coating 32.

As shown more clearly in FIG. 2, the vertically disposed wall of the boss 24, which is disposed transversely of the cup 14, is provided with notches 34 and 36 on opposite sides of the central projection 38 containing bore 26. The thermocouple wires are provided with horizontally disposed portions 44 and 46 which extend radially from the bore 26, across the notches 34 and 36, to the slots in peripheral projections 40 and 42. The exposed portions of the thermocouple wires in FIG. 1 at notches 34 and 36 are adapted to cooperate with contact structure to facilitate coupling the thermocouple to a recorder which produces a thermal arrest curve or graph to determine liquidus temperature, solidus temperature, and eutectoid temperature usable in estimating carbon equivalent values and other metallurgical properties.

The refractory coating 32 should have the following attributes: It must withstand a temperature up to 2,800°F, having an annealing point in the range of about 2,000°F to 2,100°F, and remain plastic up to a temperature of about 2,450°F. By plastic is meant sufficient plasticity to accommodate to shrinkage of the molten metal without fracture.

An analysis of a typical commercially available refractory shows that it consists primarily of:

|  | Wt. Percent |
| --- | --- |
| $Al_2O_3$ | 83 |
| $SiO_2$ | 15.1 |
| $FeO_3$ | 0.4 |
| $CaO$ | 0.2 |
| $MgO$ | 0.1 |
| $Na_2CO_3$ | 0.7 |
| $TiO_2$ | 0.5 |

The $Al_2O_3$ is 75 percent fused alumina with a silica clay binder. The refractory is comprised of grains having a size such that none to a trace remain on a No. 70 sieve and grains having a size such that a trace to ten percent remain on a No. 100 sieve.

While there are a variety of suitable refractories available, a commercial example of a refractory having the constituents described above is PA 748 ALUNDUM patch primer or undercoat material which is sold by Norton Co., Worcester, Massachusetts. PA 748 ALUNDUM has an annealing point of about 2,000°F to 2,100°F. The two major ingredients of said material have a liquidus temperature of 2,813°F.

The above-identified ingredients for the refractory coating 32 in dry powder form were mixed with water at room temperature to form a slurry. A suitable mixture is 25 lbs. powder and 10 lbs. water. The slurry was then applied to cup 14 as described above in any convenient manner such as by spraying or swabbing with a thickness of about 1/64 of an inch. Thereafter, the coating is permittted to cure in an oven at about 120°F to drive off the water. The coating is a suspension which has conventional water soluble organic hardening agents to act as a binder to prevent the coating from cracking during cooling.

The liquidus arrest temperature for hypoeutectic cast iron is between about 2,090°F and 2,450°F. The solidus arrest temperature is about 2,100°F and is the temperature range at about where failures had occurred heretofore. Cups having a refractory coating 32 as described above have performed excellently by producing a pronounced thermal arrest without a single failure which could be traced to a failure of the thermocouple as described above. It is theorized that the annealing point of the refractory material which is as set forth above enables the refractory material to remain sufficiently plastic so as to accommodate the shrinkage of the cast iron as it solidifies without effecting a cracking of the center post defined by the dual bore cylinder 28.

In FIG. 3, there is illustrated a vertical sectional view of another embodiment of the present invention designated 14'. The cup 14' is the same as cup 14 except as will be made clear hereinafter. Accordingly, corresponding elements are provided with corresponding primed numerals.

In FIG. 3, there is no support post or cylinder. The individual thermocouple wires 50 and 52 are coated so as to be surrounded by the refractory material utilized as coating 32 in cup 14. Some of the refractory material is utilized to coat the hot junction 30' and some of said material is applied to the bottom wall 20' to prevent molten metal from flowing downwardly through the bore 26'. Since there is no support post, bore 26' may be of smaller diameter than bore 26. If desired, a separate bore 26' may be provided for each thermocouple wire.

The above-identified ingredients for the refractory coating 32 are not critical and various substitutions will immediately be apparent to those skilled in the art. The thickness of the refractory coating is not critical but should be a continuous coating without any bare spots. While the above description refers to the molten metal as being cast iron, it will be obvious to those skilled in the art that phase change cups of the present invention may be utilized with other molten metals such as bronze.

In cup 14, the refractory coating 32 that is applied to the bottom wall 20 prevents molten metal from flowing downwardly through the bore 26 and helps to maintain the dual bore cylinder 28 in assembled position. In cup 14', the thermocouples 50 and 52 are held in position by the coating 32 of refractory material applied to the bottom wall 20'.

The present invention may be embodied in other specific forms without departing from the spirit or essential attributes thereof, and accordingly, reference should be made to the appended claims, rather than to the foregoing specification as indicating the scope of the invention.

We claim:

1. Apparatus comprising a phase change detector cup which is open at the top, said cup having a bottom wall spaced from said open top, a thermocouple for detecting phase change of molten metal in the cup, means in the cup supporting the thermocouple so that the thermocouple hot junction is inside the cup spaced radially inwardly from the walls of the cup and so that the thermocouple has exposed portions outside the cup for electrical contact, said means including a refractory coating surrounding that portion of the thermocouple wires between said hot junction and the wall of the cup which supports the thermocouple and exposed for contact with molten metal, said refractory coating having an annealing point in the range of about 2,000°F. to 2,100°F. so as to be plastic in the temperature range of about 2,100°F to 2,450°F. and having a liquidus temperature in excess of 2,450°F. so that it does not liquify when molten metal is poured into the cup and accommodates to shrinkage of molten metal without fracture.

2. Apparatus in accordance with claim 1 wherein said means includes a dual bore center post having said coating thereon, said post being supported by a wall of said cup, said thermocouple wires each extending through a bore of the center post.

3. Apparatus in accordance with claim 2 wherein said post is supported by said bottom wall, and a portion of the bottom wall adjacent the post being covered by said coating.

4. Apparatus in accordance with claim 1 wherein said thermocouple wires are individually coated with said refractory coating.

5. Apparatus in accordance with claim 1 wherein said coating has a liquidus temperature of about 2,800°F.

6. Apparatus in accordance with claim 1 wherein said coating is applied to substantially the entire inner surface of said cup.

* * * * *